W. R. A. KEMP.
DEVICE FOR STRINGING AND CUTTING BEANS FOR COOKING.
APPLICATION FILED SEPT. 20, 1912.
1,060,605.
Patented May 6, 1913.
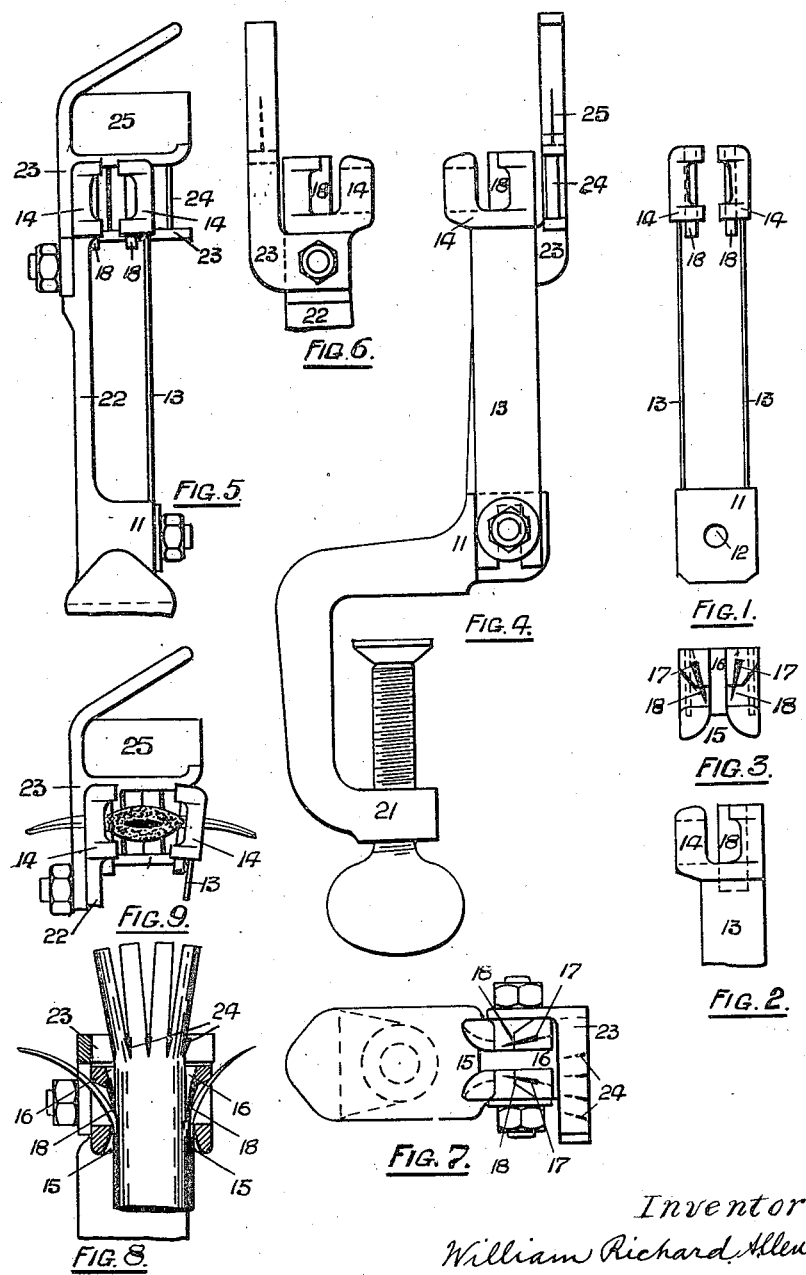
Witnesses:
Harry Chew
Bernard Cowen
Inventor:
William Richard Allender Kemp
by Henry D. Williams
Attorney.

UNITED STATES PATENT OFFICE.

WILLIAM RICHARD ALLENDER KEMP, OF MAIDA ROAD EPPING, NEAR SYDNEY, NEW SOUTH WALES, AUSTRALIA.

DEVICE FOR STRINGING AND CUTTING BEANS FOR COOKING.

1,060,605. Specification of Letters Patent. Patented May 6, 1913.

Application filed September 20, 1912. Serial No. 721,384.

*To all whom it may concern:*

Be it known that I, WILLIAM RICHARD ALLENDER KEMP, a subject of the King of Great Britain, residing at Maida Road Epping, near Sydney, in the State of New South Wales and Commonwealth of Australia, have invented a new and useful Improved Device for Stringing and Cutting Beans for Cooking, of which the following is a specification.

This invention refers to the preparing of beans specially French or kidney beans for cooking by stringing them (or removing their strings from their edges) and as well by cutting or slicing them though the cutting or slicing may be dispensed with and it relates to an improved device for the stringing of such beans and with modifications for the cutting and slicing into narrow strips as well as the stringing of the beans and which devices will very materially reduce or minimize the labor required to effectively so prepare the beans.

This improved device comprises principally two limbs or members adapted to be resiliently separated from one another and having heads or caps adapted to meet and form an orifice or passage way partly across which (held by said heads) are two converging blades or knives. The resiliency of one or of both the said limbs and the set of the said blades is such that upon the bean being passed through the orifice on to the blade edges it will open the limbs to the required extent to allow it to pass through the heads and leave outside the blades the strings which said blades will cut from its edges. And this improved device comprises further the above described stringing heads and blades and at the rear of the orifice or passage between the heads or caps of the resiliently related limbs or members a grid or plurality of slicing blades with edges peculiarly directed to cut the passing bean into narrow strips. And by preference a knife or blade for cutting the ends of the beans is added to the device. This improved device may be affixed in any convenient manner to a table or other structure but preferably has a clamp formed integral therewith. But in order that a practical construction of this improved device for stringing and cutting beans for cooking may be clearly understood the same will now be described with reference to the drawings accompanying and forming part of this complete specification.

Figure 1 is a front elevation of the devices for stringing alone and Figs. 2 and 3 are partial side view and a plan respectively of the same. Fig. 4 is a side view of the device for stringing and cutting or slicing beans with a knife for the ends and a table clamp complete. Figs. 5 and 6 are partial front and side views and Fig. 7 a plan of this device while Fig. 8 is a sectional plan through the heads showing a bean being operated upon and Fig. 9 a front elevation of the same.

The holder or base 11 of the two spring limbs or members 13 may be of any construction though as shown is adapted to be fastened to a support through the hole 12. Each limb 13 has a head or cap 14 which meet together centrally vertically and have recesses forming in the adjacent facing heads a flaring or bell mouth front or entry orifice 15 and a back or discharge orifice 16. Diagonally meeting the front orifice and internally of the back orifice 16 and held in grooves 17 in each head 14 are two removable knives or blades 18 so set as to cut or plane a shaving or the strings from each edge of a bean pushed through the orifice 15 (and so resiliently separating the heads or caps 14 to the required extent).

In the more complete stringing and cutting device shown in Figs. 4 to 9 the holder 11 extends upwardly from a table clamp 21 and one limb or member 22 rigidly extends upwardly from said holder 11 having a head or cap 14 complementary to another head or cap 14 on a spring limb or member 13, extending also from said holder 11. As before described these heads 14 have front orifice 15 back orifice 16 and knives or blades 18. Removably affixed to the rigid limb 22 is a frame 23 supporting at the back of orifice 16 a plurality of knives or blades 24 facing toward a common center. This frame 23 supports a removable blade or knife 25 handy for removing the ends of the beans.

In use the holder 11 of the stringing device being affixed to a convenient support the bean preferably after its ends have been removed is pushed through the orifice 15 the limbs 13 being resiliently separated by the pressure on the flaring mouth of said orifice. The edges of the knives 18 cut into the edges of the pushed bean and owing to their being set similarly to a plane iron remove as a shaving a strip, being the string, from the body of the bean. The opening between the heads on the spring limbs 13 is governed by the breadth of the bean the resiliency of said limbs 13 insuring a close and sufficient pressure on the both edges of said bean to insure regular cutting or planing by knives 18.

With the more complete device the beans may have their ends removed by blade 25 and then their edges or strings are shaved off by the knives 18 whose pressure is affected by the one spring limb 13 in addition as the bean is pushed through the heads 14 the knives 24 divide it up into longitudinal strips or slices. The set of these knives 24 is angularly to one another and each edge faces a common vertical line positioned about the average center of the variable discharge opening 16 forwardly of the entry orifice 15 a short distance so as to insure that the slicing will be easily effected no matter what is the breadth of bean and that no jamming of the bean or the slices thereof will take place.

While the slicing blades 24 and the end-cutting blade 25 are only shown as embodied in the form of the device illustrated in Figs. 4 to 9, inclusive, of the drawings, it is to be understood that similar blades or their equivalents could also be embodied in the form of the device in which both of the head-carrying limbs are resilient, such as illustrated in Figs. 1, 2 and 3.

What I claim as my invention, and desire to secure by Letters Patent is:—

1. A device for stringing beans comprising a flat and straight resilient limb, a base rigidly supporting such limb at one of its ends, a head carried by the free end of such limb, a second head in proximity to the first head and adjacent to the flat side of such limb, the adjacent sides of the heads being provided with bean-guiding surfaces adapted to guide the bean in a path transverse to the resilient limb and in substantial parallelism to its flat sides, a support for the second head carried by the base, and a string-remover on each head in the path of the edge portions of the bean as it passes between the bean-guiding surfaces of the heads.

2. A device for stringing beans comprising a flat and straight resilient limb, a base rigidly supporting such limb at one of its ends, a head carried by the free end of such limb, a second head in proximity to the first head and adjacent to the flat side of such limb, the adjacent sides of the heads being provided with bean-guiding surfaces adapted to guide the bean in a path transverse to the resilient limb and in substantial parallelism to its flat sides, a rigid support for the second head carried by the base, and a string-remover on each head in the path of the edge portions of the bean as it passes between the bean-guiding surfaces of the heads.

3. A device for stringing and slicing beans comprising relatively spring-pressed heads, a string-removing knife mounted on each head, and a slicing device in proximity to the string-removing knives in the path of movement of the bean between such knives.

4. A device for stringing and slicing beans comprising relatively spring-pressed heads, a string-removing knife mounted on each head, and a plurality of stationary slicers at the rear of the cutting edges of the string-removing knives in the path of movement of the bean so that the string-removing knives and the slicers will be in engagement with the bean concurrently.

5. A device for stringing and slicing beans comprising a rigidly upstanding limb, a spring-pressed upstanding limb alongside of the rigid limb, supporting means for the limbs, heads carried by the upper ends of the limbs, a string-removing knife mounted on each head, and a slicing device supported by the rigid limb and projecting into the path of the bean rearwardly from the heads.

6. A device for stringing and slicing beans comprising a rigidly upstanding limb, a spring-pressed upstanding limb alongside of the rigid limb, supporting means for the limbs, heads carried by the upper ends of the limbs, a string-removing knife mounted on each head, a frame supported by the rigid limb, and a plurality of substantially radially disposed slicing blades carried by the frame at the rear of the heads in the path of the advancing bean.

7. A device for stringing and slicing beans comprising relatively spring-pressed heads, a string-remover on each head, and a plurality of substantially radially disposed slicing blades at the rear of the heads in the path of the advancing bean.

8. A device for stringing beans comprising a flat and straight resilient limb, a base rigidly supporting such limb at one of its ends, a head carried by the free end of such limb, a second head in proximity to the first head and adjacent to the flat side of such limb, the adjacent sides of the heads being provided with bean-guiding surfaces adapted to guide the bean in a path transverse to the resilient limb and in substantial parallelism to its flat sides, a rigid support for the second head carried by the base, a string-remover on each head in the path of the edge portions of the bean as it passes between the bean-guiding surfaces of the heads, and a slicing device mounted on the rigid support and projecting into the path of the bean rearwardly from the heads.

In testimony whereof I have signed my name to this specification in the presence of two subscribing witnesses.

WILLIAM RICHARD ALLENDER KEMP.

Witnesses:
 PERCY NEWELL,
 I. EASTON.